United States Patent
Damien

(10) Patent No.: US 8,061,695 B2
(45) Date of Patent: Nov. 22, 2011

(54) ADJUSTABLE MOUNTING VIBRATION ISOLATOR

(75) Inventor: Nicolas D. Damien, Safety Harbor, FL (US)

(73) Assignee: Honeywell International Inc., Morristown, NJ (US)

( * ) Notice: Subject to any disclaimer, the term of this patent is extended or adjusted under 35 U.S.C. 154(b) by 1040 days.

(21) Appl. No.: 11/758,819

(22) Filed: Jun. 6, 2007

(65) Prior Publication Data

US 2008/0302621 A1 Dec. 11, 2008

(51) Int. Cl.
*F16F 3/08* (2006.01)
(52) U.S. Cl. ......... 267/152; 267/153; 267/292; 188/379
(58) Field of Classification Search ............... 188/379; 267/292, 293, 136, 140, 145, 151, 152, 153
See application file for complete search history.

(56) References Cited

U.S. PATENT DOCUMENTS

| 5,318,397 | A | * | 6/1994 | Junkers | 411/432 |
| 5,927,680 | A | | 7/1999 | Bridges et al. | |
| 6,196,514 | B1 | | 3/2001 | Kienholz | |
| 6,789,993 | B2 | * | 9/2004 | Ozawa et al. | 411/546 |
| 2003/0030201 | A1 | * | 2/2003 | Williams | 267/140.13 |

FOREIGN PATENT DOCUMENTS

WO WO9102921 3/1991

* cited by examiner

*Primary Examiner* — Xuan Lan Nguyen
(74) *Attorney, Agent, or Firm* — Fogg & Powers LLC

(57) ABSTRACT

A device of the invention includes a vibration isolator with an elastomeric damper and inner and outer connectors. The inner connector has external and internal threads, and the outer connector has internal threads. A method of the invention includes attaching the vibration isolator to a block by screwing external threads of an internal connector of the isolator into the block. The block with attached isolators is inserted into an enclosure, and each isolator is loosened as necessary to make a flush fit with the enclosure. A screw is then inserted into each isolator and fastens the isolator to the block at the flush position. Finally, a screw is inserted through the enclosure into each isolator to connect the isolators to the enclosure.

8 Claims, 6 Drawing Sheets

ADJUSTABLE MOUNTING VIBRATION ISOLATOR

BACKGROUND OF THE INVENTION

Inertial sensing instruments such as gyroscopes and accelerometers are often mounted on a platform or block. The block is then mounted in an enclosure using elastomeric vibration isolators. For a cube-shaped block, it is desirable to attach the isolators to the corners of the block because it creates favorable dynamic response characteristics and saves space. In the case of corner-mounted vibration isolators, the corners of the block are shaved off to create a flat surface on which to mount the isolators.

Referring to FIGS. 1A, 1B, and 2, a block 14 includes attached micro-electromechanical system devices such as gyroscopes or accelerometers (not shown), beneath protective covers 8 attached to faces 9 of the block 14. Vibration isolators 10 according to the prior art are attached to each corner 11 of the block 14.

A prior art isolator 10 includes an elastomeric damper 18, made of rubber, silicon, or other elastomeric materials known in the art. Example isolators 10 are made by many companies, including Barry Controls and the Lord Corporation. The damper 18 is molded to an outer connector 20 and an inner connector 22, both of which may be made of aluminum, stainless steel, or other materials known in the art. The damper 18 prevents contact between the outer connector 20 and the inner connector 22. The isolator 10 is attached to the block 14 at a corner 11 of the block 14 by screwing external threads 24 of the inner connector 22 into a threaded aperture (not shown) in each corner 11, and a screw 16 attaches the enclosure 12 to the isolator 10 via internal threads 26 in the outer connector 20. One problem with corner-mounted isolators 10 is that the tolerances of the enclosure 12, the block 14, and the isolators 10 are of limited precision such that when the block 14 with attached isolators 10 is inserted into the enclosure 12, there are gaps 17 between the isolators 10 and the enclosure 12. When a block 14 with attached isolators 10 is mounted in an enclosure 12 via screws 16 through the enclosure 12 and isolators 10, the isolators 10 are compressed or stretched by some small amount. This distortion of the isolators 10 causes a shift or misalignment of the block 14 with the enclosure 12, which can be on the order of 0.02 inches on a one inch diameter isolator 10. This distortion alters the vibration isolation characteristics of the isolators 10.

SUMMARY OF THE INVENTION

The present invention provides a vibration isolation system. An example embodiment of the invention includes a vibration isolator with an elastomeric damper and inner and outer connectors. The inner connector has external and internal threads, and the outer connector has internal threads. The device also includes a pair of screws, one for connecting the isolator to an enclosure, and one for connecting the isolator to a block.

In an example embodiment, the vibration isolator is attached to a block by screwing external threads of an internal connector of the isolator into the block. The block with attached isolators is inserted into an enclosure, and each isolator is loosened as necessary to make a flush fit with the enclosure. A screw is then inserted into each isolator and fastens the isolator to the block at the flush position. Finally, a screw is inserted through the enclosure into each isolator to connect the isolators to the enclosure.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1A:
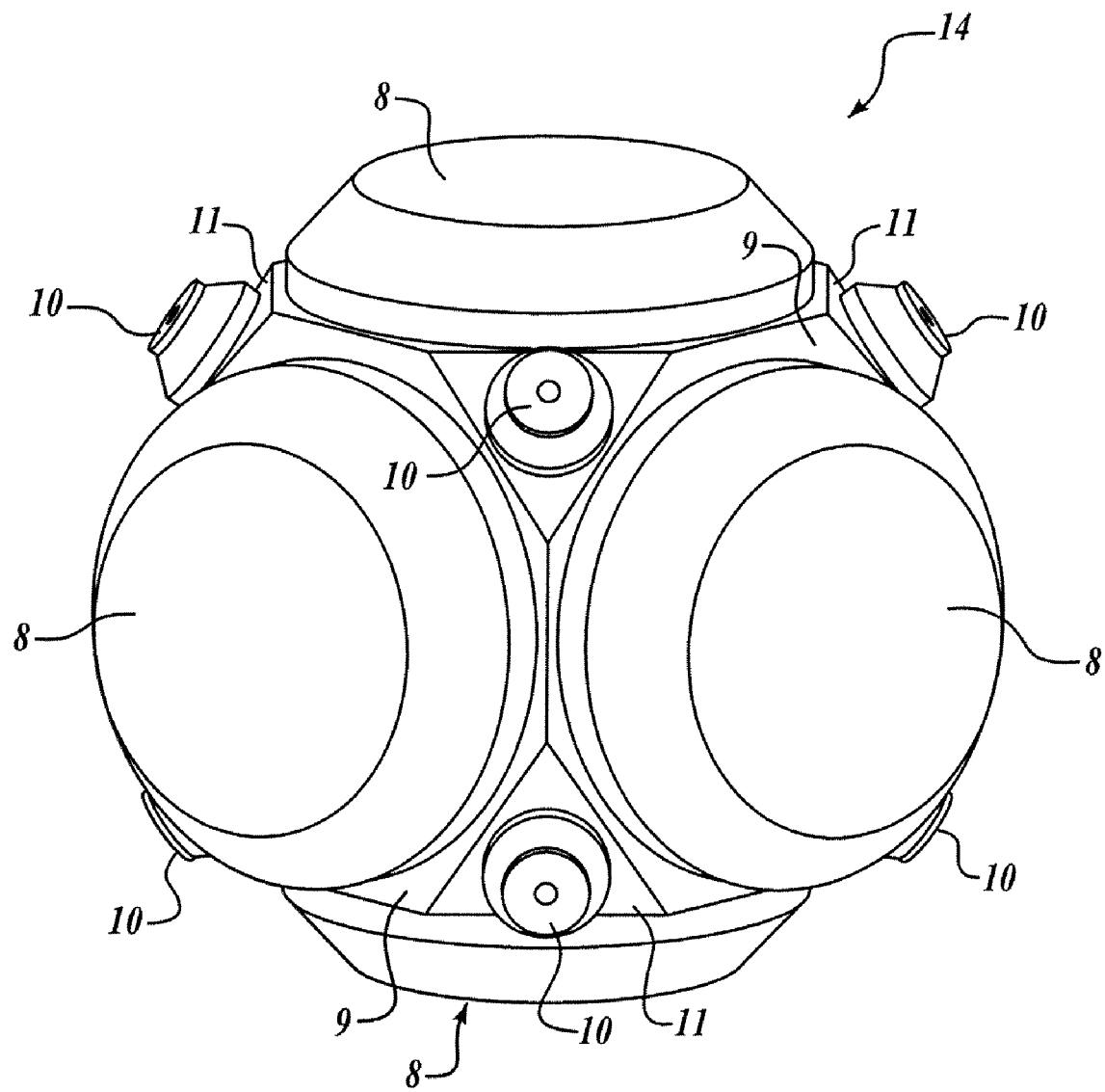
FIG. 1A is a perspective view of a block with attached isolators according to the prior art.
Figure 1B:
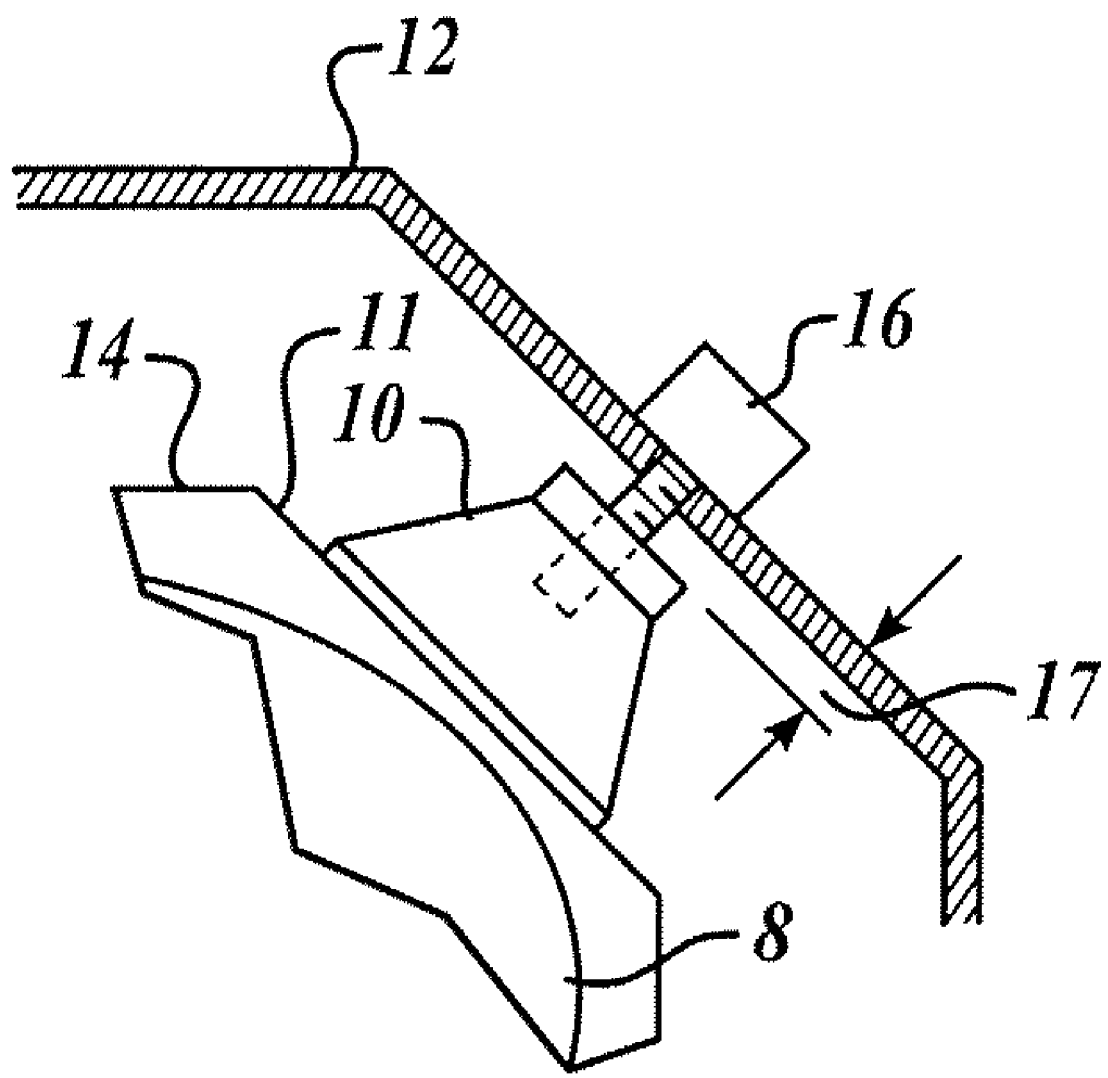
FIG. 1B is a cross-section of a face of the block of FIG. 1A with attached isolators in an enclosure.
Figure 2:
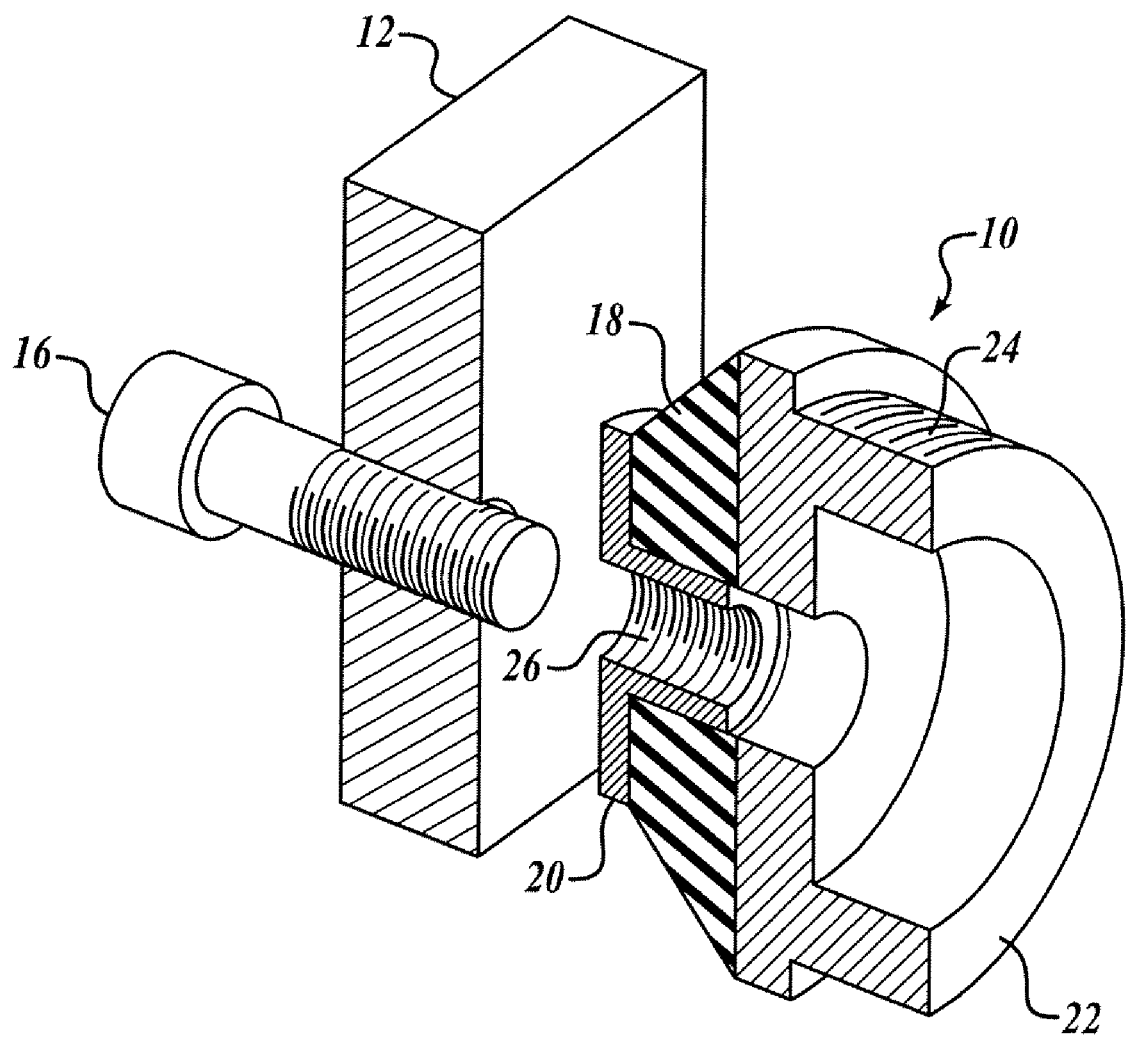
FIG. 2 is an exploded cross-section of a prior art isolator, screw, and block.
Figure 3A:
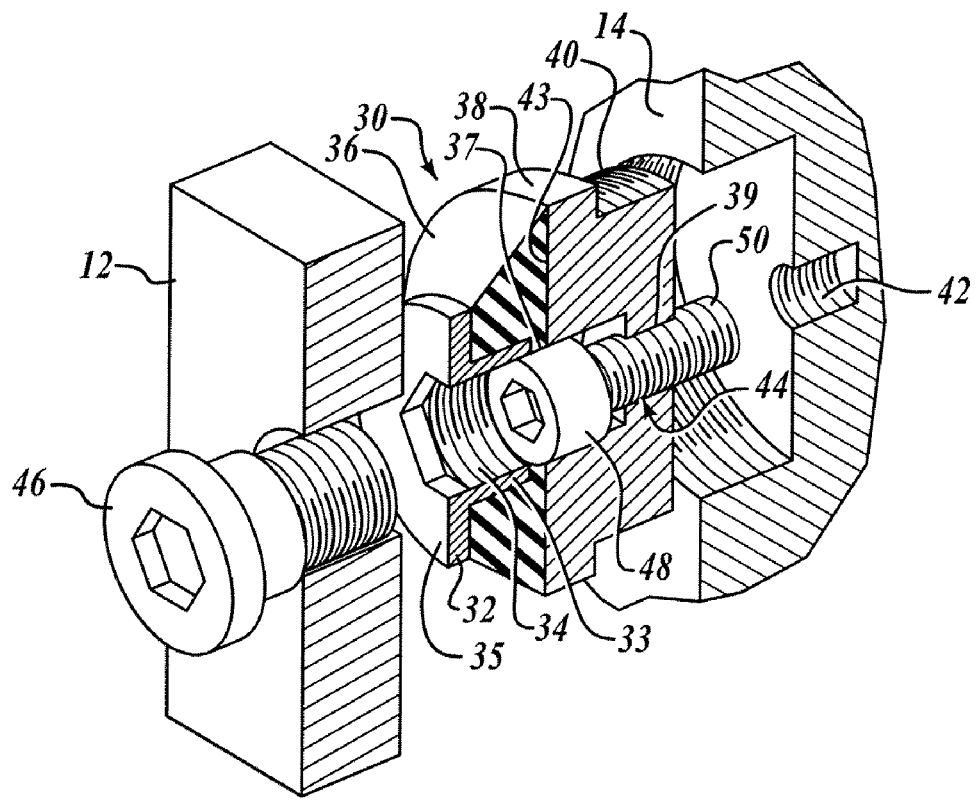
FIG. 3A is an exploded partial cross-section of a device according to an embodiment of the present invention.
Figure 3B:
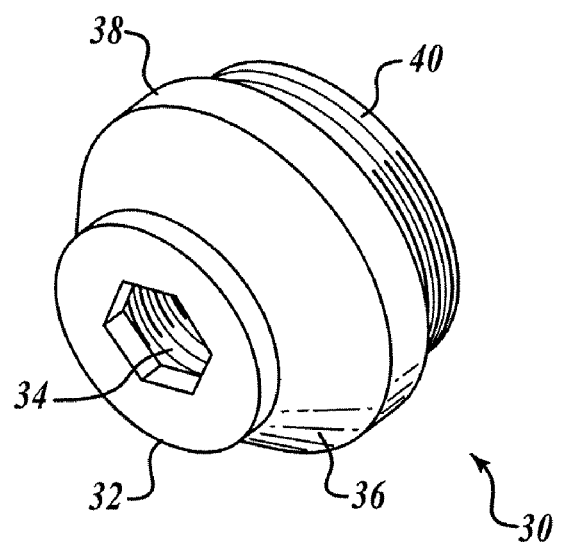
FIG. 3B is a perspective view of the device of FIG. 3A.

With reference to FIGS. 3A and 3B, a vibration isolator 30 according to one embodiment of the present invention reduces the amount of vibration transmitted from an enclosure 12 to a block 14. The vibration isolator 30 includes an outer connector 32 attachable to the enclosure 12, an inner connector 38 attachable to the block 14, and an elastomeric damper 36 coupled to the outer connector 32 and the inner connector 38. The damper 36 prevents contact between the outer connector 32 and the inner connector 38.

The outer connector 32 includes a hollow cylinder 33 with internal threads 34 and a flat outer flange 35 for making flush contact with the enclosure 12. The elastomeric damper 36 is conical, tapering from the inner connector 38 to the outer connector 32, and includes a hollow cylinder 37 axially aligned with the threaded cylinder 33 of the outer connector 32. The inner connector 38 includes a hollow cylinder 39 with external threads 40, and a flat outer flange 43 attached to the damper 36. The isolator 30 is attached to a block 14 via external threads 40 and an internal screw 44 attached to the block 14 at threads 42. The isolator 30 is attached to an enclosure 12 via an external screw 46 and the internal threads 34. The damper 36, for example, may be an elastomeric material such as rubber, and the connectors 32,38 may be stainless steel. As long as the connectors 32,38 are very rigid, and the damper 36 is relatively soft, many materials may be used.

In an embodiment, the internal screw head 48 has a larger diameter than the internal screw shaft 50. Additionally, the internal screw head 48 has a smaller diameter than the outer connector internal threads 34 such that the threads 34 do not interfere with the movement of the internal screw 44.

Figure 4:
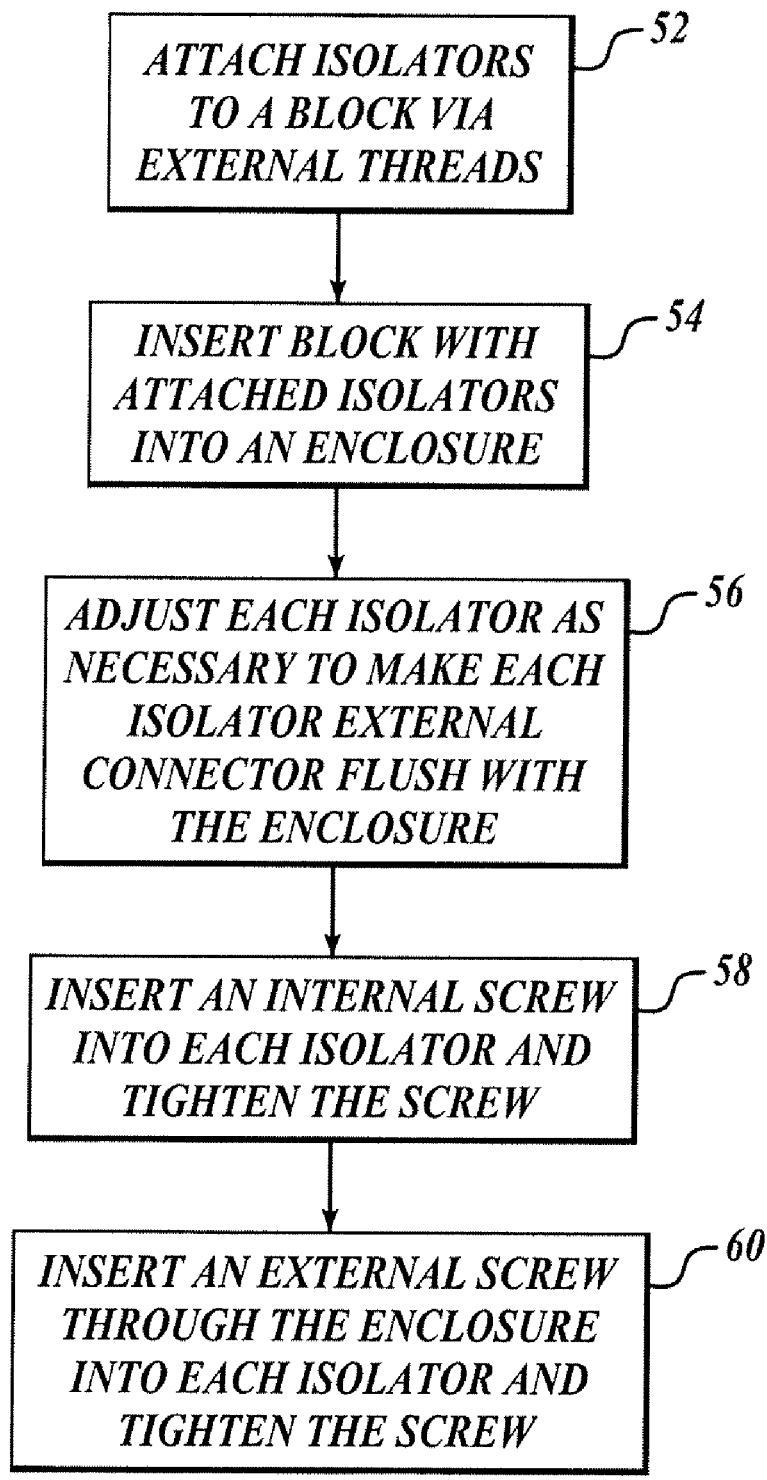
FIG. 4 is a flow diagram of a method according an embodiment of the present invention.
Figure 5A:
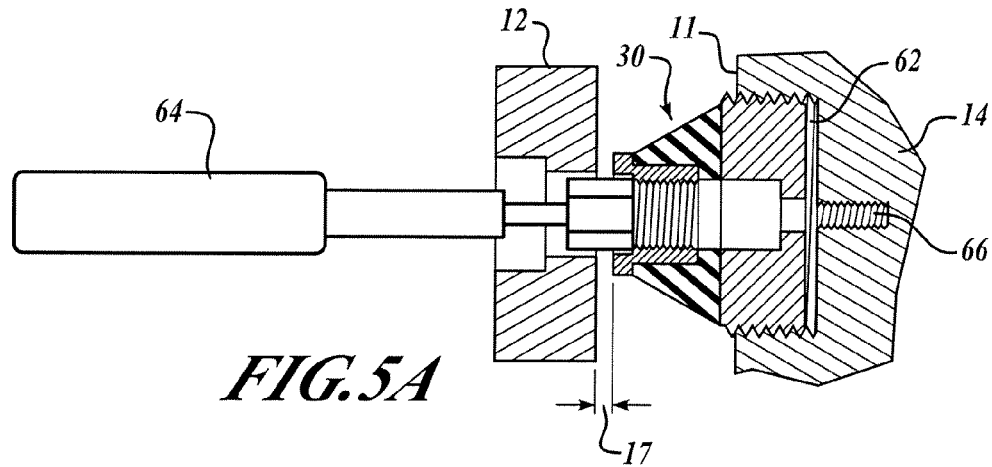
FIGS. 5A, 5B, and 5C illustrate steps in the method of FIG. 4.
Figure 5B:
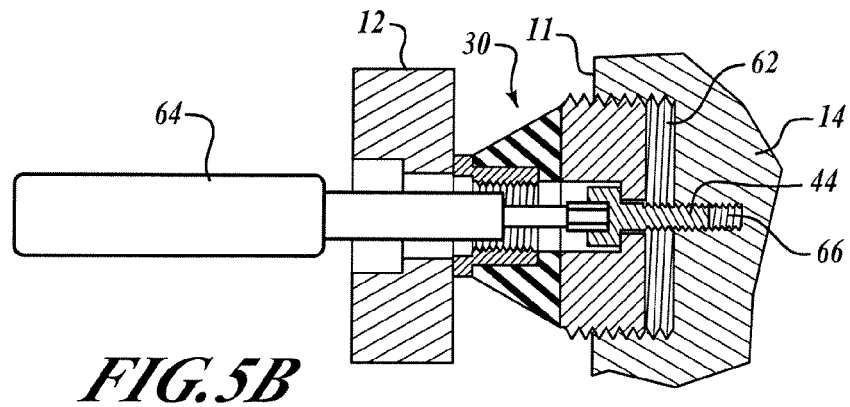
Figure 5C:
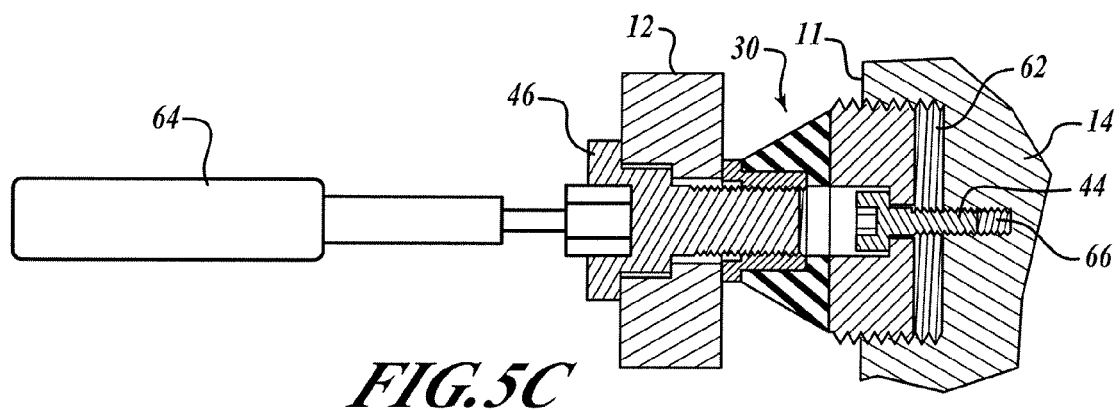

With reference to FIGS. 4 and 5A-5C, an embodiment of a method according to the present invention is illustrated. In FIG. 4, at a block 52, an isolator 30 is attached to each corner 11 of a block 14 by screwing the external threads 40 of the inner connector 38 of each isolator 30 into a first threaded receptacle 62 of a corner 11 of the block 14. At a block 54, the block 14 with attached isolators 30 is inserted into an enclosure 12, as illustrated in FIG. 5A. At a block 56, each isolator 30 is unscrewed as necessary using a tool 64 (which may be a hex wrench, a torque wrench, or other suitable tool) to eliminate gaps 17 between each isolator 30 and the enclosure 12, as illustrated in FIG. 5B. At a block 58, an internal screw 44 is inserted into each isolator 30 and a second threaded receptacle 66 of the corner 11 of the block 14 and tightened to fix the position of the isolator 30 relative to the block 14, also shown in FIG. 5B. Finally, at a block 60, an external screw 46 is inserted through the enclosure 12 into each isolator 30 and tightened to attach the isolator 30 to the enclosure 12, as illustrated in FIG. 5C.

While the preferred embodiment of the invention has been illustrated and described, as noted above, many changes can be made without departing from the spirit and scope of the invention. For example, the example embodiments are shown using hex tools and hex nuts, but other fasteners could be used. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device comprising:
    a damper;
    an outer connector with internal threads, the outer connector attached to the damper;
    an internal screw, wherein the threads of the internal screw only engage internal threads of a block when the internal screw is inserted through the internal threads of the outer connector; and
    an inner connector including a hollow cylinder with external threads, the inner connector attached to the damper.

2. The device of claim 1, wherein the internal threads of the outer connector are coaxial with the hollow cylinder of the inner connector.

3. The device of claim 1, further including the block, the block having shaved-off corners creating flat surfaces for mounting to inner connectors, the flat surfaces further comprising:
    a first threaded receptacle sized and shaped to receive the external threads of the inner connector, and,
    a second threaded receptacle sized and shaped to receive the internal screw.

4. The device of claim 3, wherein the first and second threaded receptacles are coaxial, and the first threaded receptacle has a larger diameter than the second threaded receptacle.

5. The device of claim 1, wherein the damper is an elastomeric damper.

6. The device of claim 1, wherein the inner connector and the outer connector are made of stainless steel.

7. The device of claim 1, wherein the hollow cylinder includes internal threads.

8. A method comprising:
    attaching at least one isolator to a block via external threads of an inner connector of the at least one isolator and first internal threads of the block;
    inserting the block with attached at least one isolator into an enclosure;
    adjusting the at least one isolator as necessary to make an external connector of the at least one isolator flush with the enclosure;
    inserting an internal screw into the at least one isolator and engaging second internal threads of the block with the internal screw and tightening the internal screw, wherein inserting the internal screw into the at least one isolator includes passing the internal screw through the internal threads of the external connector, the threads of the internal screw sized and shaped to only engage the second internal threads of the block; and
    inserting an external screw through the enclosure into the external connector of the at least one isolator and engaging the internal threads of the external connector and tightening the external screw.

* * * * *